US012349113B2

(12) United States Patent
Wu et al.

(10) Patent No.: US 12,349,113 B2
(45) Date of Patent: Jul. 1, 2025

(54) SENSING FOR USER EQUIPMENT (UE) SUPPORTING SIDELINK DISCONTINUOUS RECEPTION (SL-DRX)

(71) Applicant: Apple Inc., Cupertino, CA (US)

(72) Inventors: Zhibin Wu, Los Altos, CA (US); Chunxuan Ye, San Diego, CA (US); Haitong Sun, Cupertino, CA (US); Yuqin Chen, Beijing (CN); Haijing Hu, Los Gatos, CA (US); Wei Zeng, Saratoga, CA (US); Srirang A. Lovlekar, Fremont, CA (US); Sethuraman Gurumoorthy, San Ramon, CA (US); Naveen Kumar R. Palle Venkata, San Diego, CA (US); Adesh Kumar, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/439,772

(22) PCT Filed: Sep. 25, 2020

(86) PCT No.: PCT/CN2020/117585
§ 371 (c)(1),
(2) Date: Sep. 15, 2021

(87) PCT Pub. No.: WO2022/061683
PCT Pub. Date: Mar. 31, 2022

(65) Prior Publication Data
US 2023/0362896 A1 Nov. 9, 2023

(51) Int. Cl.
H04W 72/0446 (2023.01)
H04W 52/02 (2009.01)
(Continued)

(52) U.S. Cl.
CPC .... *H04W 72/0446* (2013.01); *H04W 52/0225* (2013.01); *H04W 72/25* (2023.01); *H04W 76/28* (2018.02)

(58) Field of Classification Search
CPC ......... H04W 72/0446; H04W 52/0225; H04W 72/25; H04W 76/28
(Continued)

(56) References Cited

U.S. PATENT DOCUMENTS

2020/0205165 A1  6/2020  Huang et al.
2020/0344722 A1* 10/2020  He .......................... H04W 4/46
(Continued)

FOREIGN PATENT DOCUMENTS

AU   2017264328 A1   11/2018
CN   111356240 A      6/2020
(Continued)

OTHER PUBLICATIONS

International Search Report and Written Opinion of the International Searching Authority directed to related International Patent Application No. PCT/CN2020/117585, mailed Jun. 23, 2021; 9 pages.
(Continued)

*Primary Examiner* — Kwang B Yao
*Assistant Examiner* — Syed M Bokhari
(74) *Attorney, Agent, or Firm* — Sterne, Kessler, Goldstein & Fox P.L.L.C.

(57) ABSTRACT

Some embodiments include a system, method, and computer program product for managing power consumption of a user equipment (UE) supporting sidelink discontinuous reception (SL-DRX) in a 5G wireless communications system. A UE determines a candidate slot for sending a signal based on data sensed in various periods over a history window. Some embodiments include a processor that can determine set of
(Continued)

candidate slots that are sufficiently sensed based on sensed periods over a history window, and determine a subset of candidate slots of the set of candidate slots based at least on an occupancy threshold over the history window. The processor can select a candidate slot from the subset of candidate slots, and transmit via the transceiver, a first signal via the selected candidate slot.

20 Claims, 8 Drawing Sheets

(51) Int. Cl.
  *H04W 72/25* (2023.01)
  *H04W 76/28* (2018.01)
(58) Field of Classification Search
  USPC .......................................................... 370/329
  See application file for complete search history.

(56) References Cited

U.S. PATENT DOCUMENTS

| | | | |
|---|---|---|---|
| 2020/0374861 A1* | 11/2020 | Shilov | H04W 4/46 |
| 2021/0219268 A1* | 7/2021 | Li | H04B 17/318 |
| 2021/0227602 A1* | 7/2021 | Li | H04W 76/28 |
| 2021/0227604 A1* | 7/2021 | Huang | H04W 40/248 |
| 2022/0053460 A1* | 2/2022 | Yu | H04W 76/28 |
| 2023/0050353 A1* | 2/2023 | Miao | H04W 74/0808 |
| 2023/0319578 A1* | 10/2023 | Farag | H04W 74/08 370/330 |

FOREIGN PATENT DOCUMENTS

| | | |
|---|---|---|
| WO | WO 2020/029067 A1 | 2/2020 |
| WO | WO 2020145724 A1 | 7/2020 |

OTHER PUBLICATIONS

3GPP, "On resource allocation for power saving," R1-2006170, Aug. 28, 2020, accessed at https://www.3gpp.org/ftp/TSG_RAN/WG1_RL1/TSGR1_102-e/Docs/.

3GPP, "On sidelink mode-2 resource allocation," R1-1911067, Oct. 20, 2019, accessed at https://www.3gpp.org/DynaReport/TDocExMtg--R1-98--32826.htm.

3GPP, "Discussion on sidelink DRX," R1-2005405, Aug. 28, 2020, accessed at https://www.3gpp.org/ftp/tsg_ran/WG1_RL1/TSGR1_102-e/Docs.

Huawei, "Physical layer impacts of sidelink DRX," 3GPP TSG RAN WGI #102-e, R1-2006402, Aug. 8, 2020; 4 pages.

Extended European Search Report directed to related European Application No. 20954535.9, mailed Jul. 13, 2023; 7 pages.

Indian Search Report directed to related Indian Application No. 202217032505, mailed Aug. 31, 2023; 7 pages.

MediaTek Inc., "Power saving techniques for sidelink," R1-2005642, Aug. 8, 2020; 2 pages.

Office Action and Search Report directed to related Chinese Application No. 202080086736.9, with English-language machine translation attached, mailed Oct. 1, 2024; 20 pages.

* cited by examiner

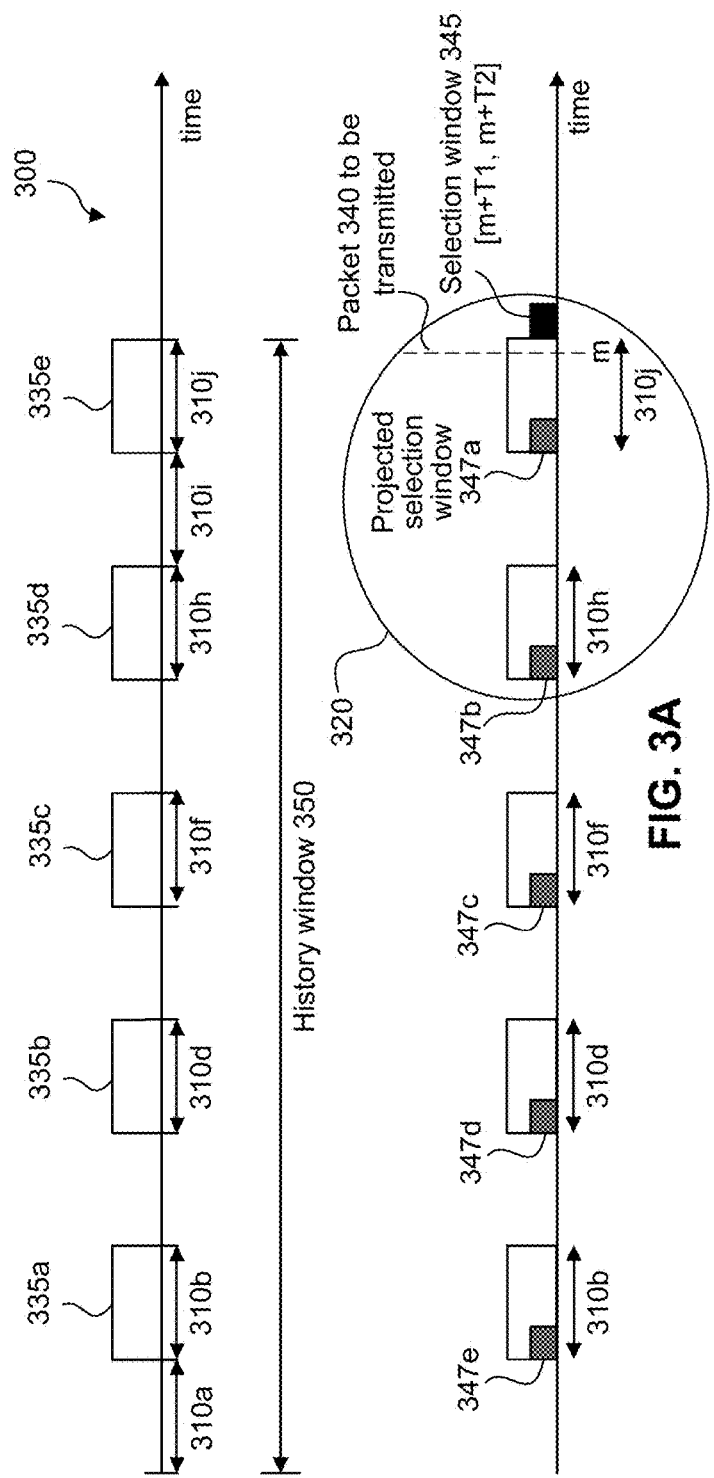
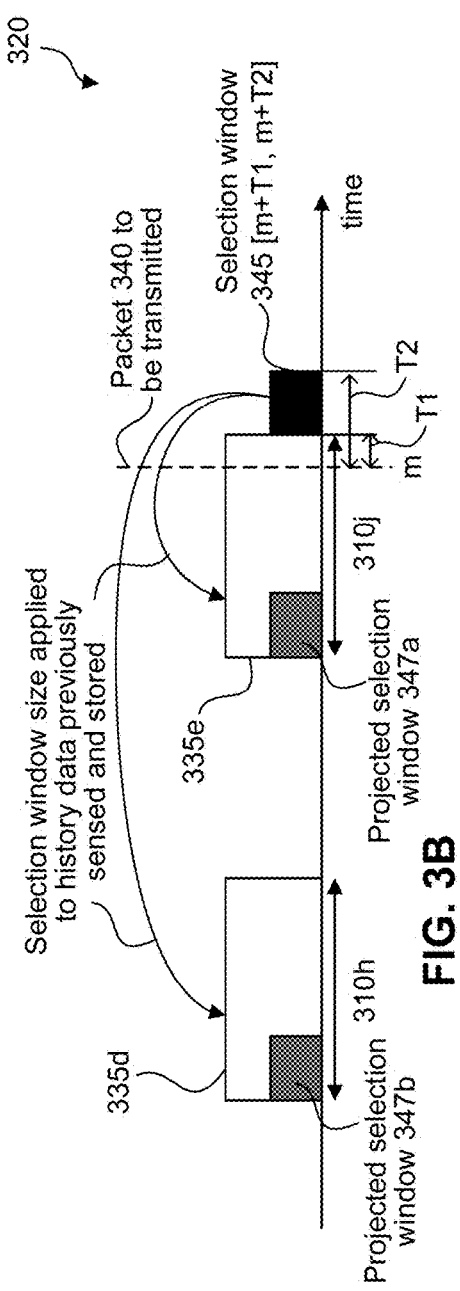
FIG. 3A
FIG. 3B

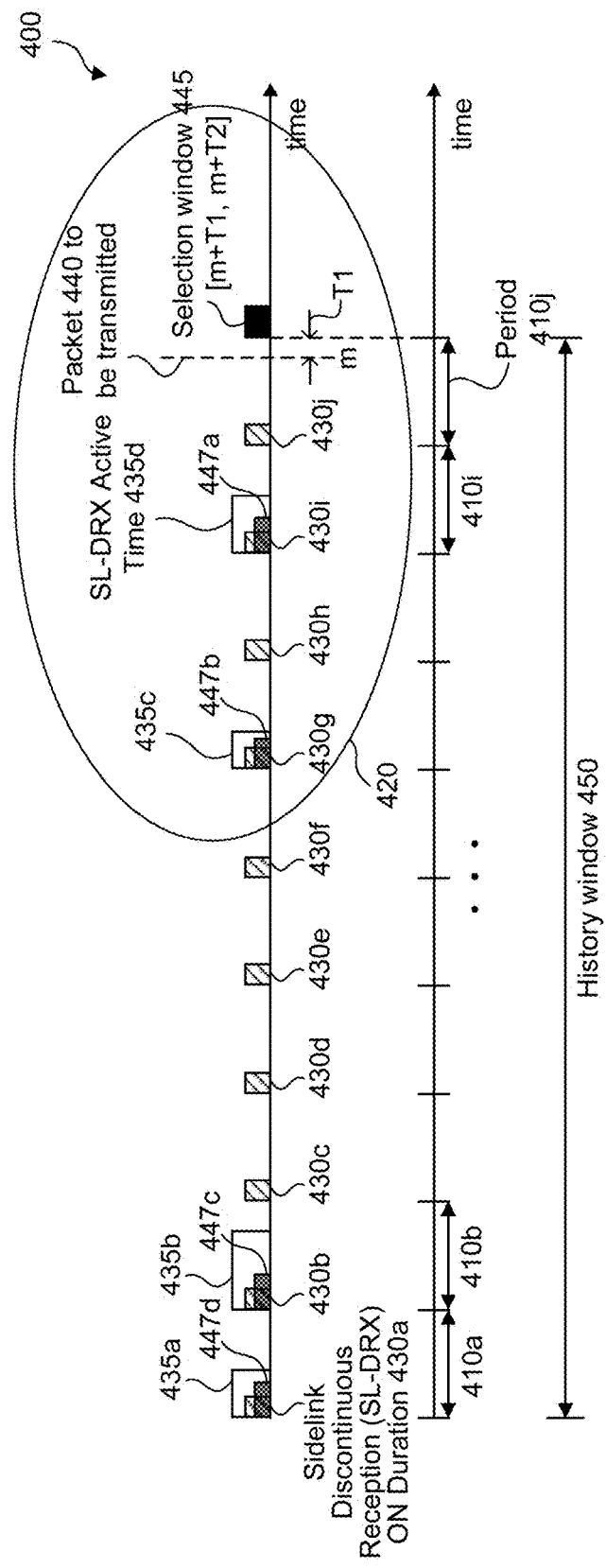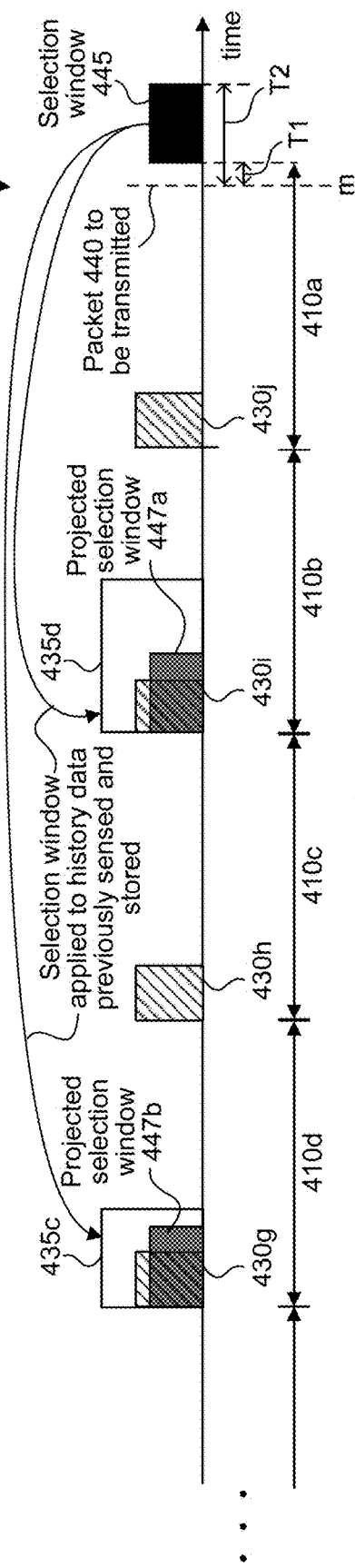
FIG. 4A
FIG. 4B

SENSING FOR USER EQUIPMENT (UE) SUPPORTING SIDELINK DISCONTINUOUS RECEPTION (SL-DRX)

BACKGROUND

Field

The described embodiments relate generally to 5G wireless communication, for user equipment (UE.)

Related Art 5G wireless communications systems include user equipment (UE) communicating with other entities including vehicles, roadside units, bicycles, and/or pedestrian UEs (P-UEs).

SUMMARY

User equipment (UE) utilizing 5G technology can establish sidelink (SL) configurations with other UEs. A UE has a receiver that monitors for packet arrivals and determines which transmit (TX) resources (e.g., slots) should be used to transmit communications with the other UEs. A packet of data is transmitted via slots on one or more subcarrier frequencies. When the UE needs to transmit a packet, the UE determines what resources (e.g., which slots) to select to transmit data. The UE relies on past slot occupancy to determine which slots to choose or avoid when transmitting the new packet. For example, to monitor for packets the UE listens on subcarrier frequencies and stores the sensed history. When the UE needs to transmit a new packet, the UE examines recent sensed history, and determines past slot occupancy. Slots that were recently occupied (e.g., already in use) are likely to be still occupied. Thus, the UE would choose different slots to transmit the new packet. Choosing the slot(s) to transmit the new packet can be called resource selection where the slots are transmission (TX) resources.

Some UEs are powered by batteries and if the receiver monitors continuously for packet arrivals the batteries can be drained. Some UEs implement sidelink discontinuous reception (SL-DRX) that allows the receiver to remain in an inactive or sleep state and wake during short periods to monitor for packets. Some UEs implement partial sensing for slot selection (e.g., resource selection) in which some periods are sensed and history is stored while some are not sensed (e.g., monitoring is skipped over a gap period) to save computational and memory costs. While SL-DRX and partial sensing both save battery power, they may cause some performance problems because not enough sensed history may be collected during the short wake periods or sensed periods as a basis for determining which slots may be available for future use. Consequently, when a packet needs to be transmitted, the UE may not have enough sensed history to determine which slots to select and/or avoid. A poorly selected slot may experience a collision resulting in retransmissions and more processing which exacerbates power usage of the battery.

Some embodiments include a system, method, and computer program product, and/or combination(s) or sub-combination(s) thereof, for a UE supporting SL-DRX with corresponding power conservation. Some embodiments include a UE configured to determine a set of candidate slots that are sufficiently sensed based on sensed periods over a history window. For example, the set of candidate slots can be a subset of candidate slots of a selection window that have sufficient measurements stored. The UE can determine a subset of candidate slots from the set of candidate slots based at least on an occupancy threshold over the history window. The UE can select a first candidate slot from the set of candidate slots, and transmit a first signal via the first candidate slot. To select the first candidate slot, each candidate slot of the subset of candidate slots has an equal opportunity to be selected, and the UE can randomly select the first candidate slot from among the subset of candidate slots. The sensed periods can correspond to a plurality of SL-DRX Active Times, and the plurality of SL-DRX Active Times can correspond to a static gap pattern over the history window.

To determine the set of candidate slots that are sufficiently sensed, the UE can detect at least q sensed periods corresponding to the first candidate slot of the set of candidate slots over the history window where q is an integer less than or equal to p, and where p is an integer corresponding to a maximum number of sensed periods of the history window that are evaluated to detect the at least q sensed periods. The corresponding SL-DRX Active Time may be greater than the configured SL-DRX ON Duration. An SL-DRX cycle includes an SL-DRX ON Duration and an SL-DRX SLEEP Duration. The UE can align a duration of the SL-DRX cycle with a period of the history window.

To create a sensed period of the q sensed periods in sidelink communications, the UE maintains sensing history by monitoring a corresponding Physical Sidelink Control Channel (PSCCH), which is only possible during the corresponding SL-DRX Active Time if SL DRX is enabled. The UE can decode the corresponding PSCCH information which can be used to predict the future occupancy/usage of resource candidates, including the first candidate slot. The UE can store the decoded corresponding PSCCH including the first candidate slot in a corresponding sensed period of the history window in memory.

To determine the set of candidate slots that are sufficiently sensed, the UE can determine a sum of actual SL-DRX SLEEP times over the history window and then determine an actual sleep ratio that equals: the sum of the actual SL-DRX SLEEP times divided by the length of the history window. When the UE determines that the actual sleep ratio satisfies a sleep ratio threshold, there may be insufficient history. Thus, instead of evaluating the sensed periods of the history window, the UE can randomly select a candidate slot (e.g., from a selection window of a common pool of candidate slots), and transmit a signal via the candidate slot.

To determine the subset of candidate slots, from the set of candidate slots, the UE can evaluate whether a corresponding occupancy level of a corresponding candidate slot over the history window satisfies an occupancy threshold.

Some embodiments include the UE establishing a SL connection with a peer UE, where the peer UE performs full sensing (e.g., a vehicle UE (V-UE) or a roadside unit (RSU).) After the SL connection is established the UE can discontinue partial sensing (e.g., discontinue determining the set of candidate slots that are sufficiently sensed over the history window), and receive during a SL-DRX ON Duration, SL sensed measurements from the peer UE. The UE can determine based at least on the SL sensed measurements, a positive candidate list, select a candidate slot from the positive candidate list, and transmit a second signal via the selected candidate slot. The UE can transmit a radio resource control (RRC) signal to the peer UE soliciting the sidelink sensed measurements of the peer UE (e.g., on demand.)

The UE can establish a second SL connection with a pedestrian-UE (P-UE), and determine that a candidate slot based associated with the second SL connection conflicts with the positive candidate list, and exclude the conflicted candidate slot from the positive candidate list. When the P-UE and the UE comprise a group and the P-UE does not perform sensing for TX slots, the UE can transmit the SL sensed measurements to the P-UE.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 3A illustrates a partial sensing example using static sensing patterns for a UE supporting SL-DRX, according to some embodiments of the disclosure.

FIG. 3B illustrates a detailed partial sensing example using static sensing patterns for a UE supporting SL-DRX, according to some embodiments of the disclosure.

FIG. 4A illustrates a partial sensing example using dynamic sensing arrangements for a UE supporting SL-DRX, according to some embodiments of the disclosure.

FIG. 4B illustrates a detailed partial sensing example using dynamic sensing arrangements for a UE supporting SL-DRX, according to some embodiments of the disclosure.

Figure 1:
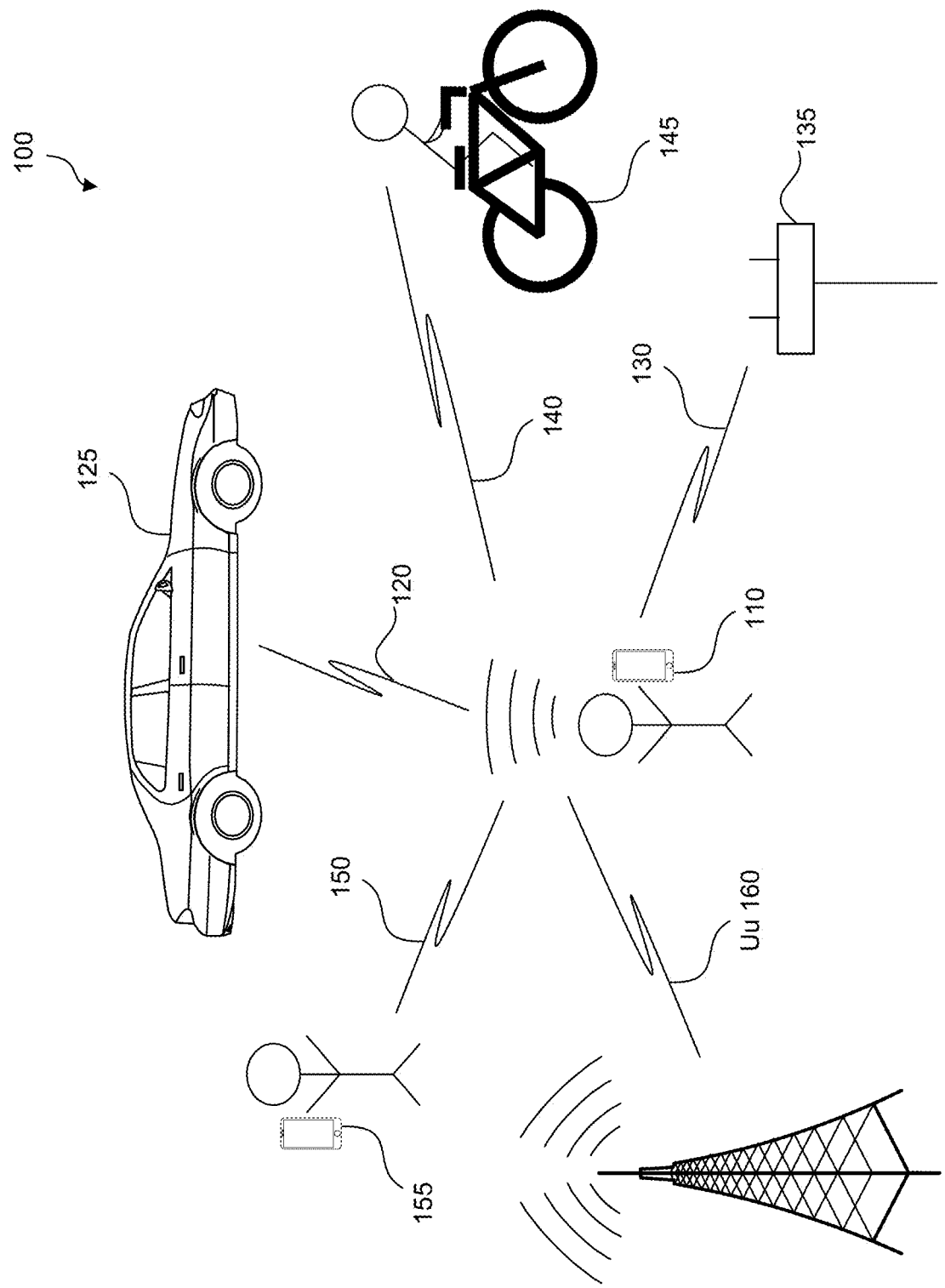
FIG. 1 illustrates an example system for a user equipment (UE) supporting sidelink discontinuous reception (SL-DRX), in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A 5G wireless communications system can include a user equipment (UE) that communicates with other UE devices such as a vehicle UE (V-UE), road side unit (RSU), a bicyclist UE, and/or a pedestrian (P-UE). Because a UE can have a limited power source (e.g., battery of a smart phone), some embodiments include a system, method and computer programing product for conserving power usage of a UE that supports sidelink discontinuous reception (SL-DRX).

FIG. 1 illustrates an example system 100 for a UE 110 supporting SL-DRX, in accordance with some embodiments of the disclosure. System 100 includes UE 110 that communicates with the following: vehicle UE (V-UE) 125 via wireless communications 120; roadside unit (RSU) 135 via wireless communications 130; bicyclist UE 145 via wireless communications 140, and/or P-UE 155 via wireless communications 150. UE 110 can also communicate with 5G node B (gNB) 165 via a Uu interface 160. While UE 110 is shown as a P-UE, UE 110 is not limited as such, and can be any type of UE depicted in system 100. Examples of the wireless communications can include but is not limited to 5G communications as defined by the $3^{rd}$ Generation Partnership Project (3GPP).

To perform the wireless communications above, UE 110 does not know when a packet will arrive. UE 110 can use a receiver to monitor 5G radio frequencies to determine for example, whether a packet has been received and whether to take action. But monitoring continuously utilizes power and drains the battery of UE 110. To conserve power, UE 110 can implement SL-DRX. When SL-DRX is enabled, UE 110 follows an SL-DRX cycle where UE 110 remains in a dormant state during an SL-DRX SLEEP Duration. In the dormant state, UE 110 is idle and does not monitor radio frequencies. To be more specific, UE 110 will skip decoding PSCCH (Physical sidelink control channels). UE 110 will not know if any packet transmissions occur or how the sidelink resources are used when in a dormant state. During a shorter SL-DRX ON Duration, UE 110 wakes to monitor radio frequencies, receive packets, and/or transmit packets. For example, a SL-DRX cycle of 320 ms includes a SL-DRX ON Duration and a SL-DRX SLEEP Duration. The SL-DRX ON Duration may be 20 ms. Thus the sensing window is 1/16 ratio of the SL-DRX cycle (e.g., 20 ms/320 ms=1/16.) During a SL-DRX ON Duration if UE 110 is triggered to conduct wireless transmission 120 (e.g., respond to V-UE 125 request) UE 110 may not have any or enough past sensed results from the previous SL-DRX cycle to determine which transmit (TX) resources to use to conduct wireless transmission 120. Some embodiments include a system, method and computer programing product for a UE that supports SL-DRX to assess whether sufficient history of sensed measurements are available, and to determine appropriate TX resources while conserving power usage.

Figure 2:
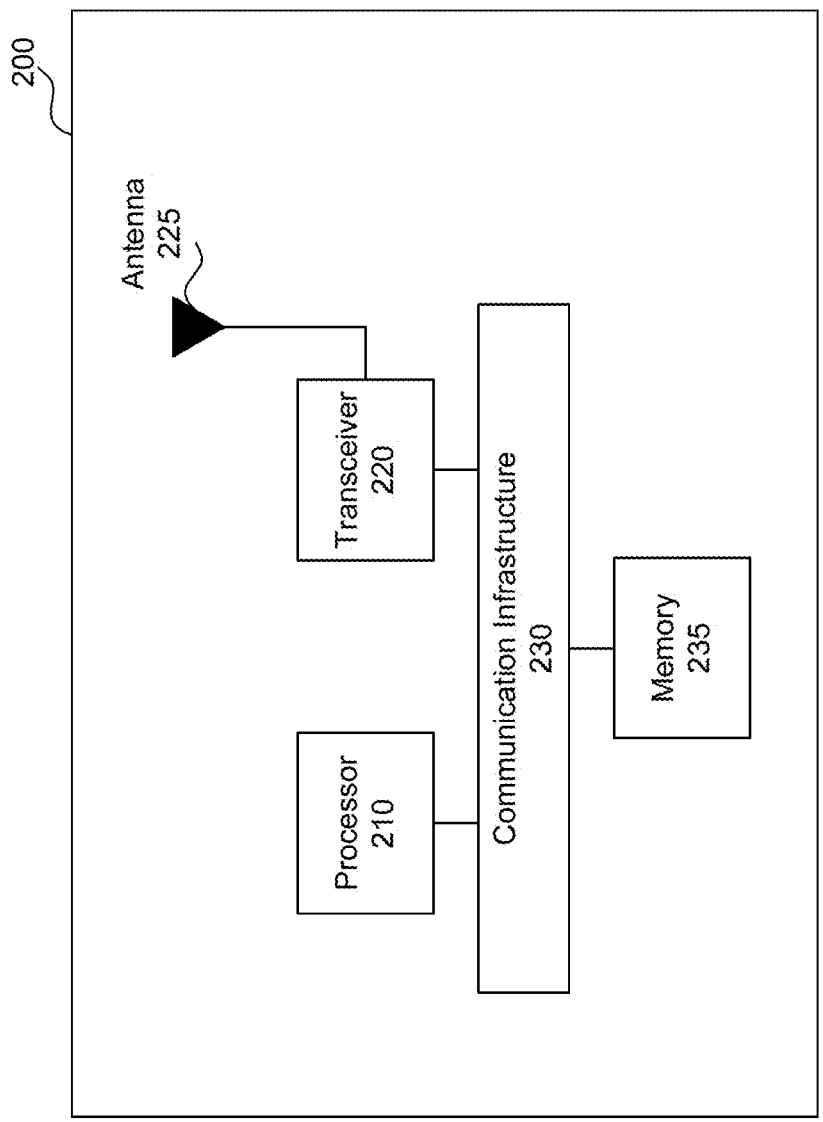
FIG. 2 illustrates a block diagram of an example wireless system for a UE supporting SL-DRX, according to some embodiments of the disclosure.

FIG. 2 illustrates a block diagram of an example wireless system 200 for a UE supporting SL-DRX and corresponding power conservation, according to some embodiments of the disclosure. As a convenience and not a limitation, system 200, may be described with elements of FIG. 1. System 200 can be UE 110, V-UE 125, RSU 135, bicyclist UE 145, and/or P-UE 155. A UE may be a computing electronic device such as a smart phone, cellular phone, and for simplicity purposes—may include other computing devices including but not limited to laptops, desktops, tablets, personal assistants, routers, monitors, televisions, printers, and appliances. System 200 may include processor 210, transceiver 220, communication infrastructure 230, memory 235, and antenna 225 that together perform operations enabling SL-DRX and corresponding power conservation. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processer 210, upon execution of the computer instructions, can be configured to perform the functionality described herein for conserving power usage of a UE that supports SL-DRX. In some embodiments, processor 210 can include its own internal memory (not shown), and/or be "hard-wired" (as in a state-machine) configured to enabling SL-DRX and corresponding power conservation described herein. Antenna 225 coupled to transceiver 220, may include one or more antennas that may be the same or different types to enable wireless communication over a wireless network.

FIGS. 3A and 3B illustrate partial sensing example 300 and 320 using static sensing periods for UE 110 supporting SL-DRX and corresponding power conservation, according to some embodiments of the disclosure. As a convenience and not a limitation, FIGS. 3A and 3B, may be described with elements of FIGS. 1 and/or 2. In example 300, UE 110 (e.g., system 200 or processor 210) monitors for packets during static sensed periods 310b, 310d, 310f, 310h, and 310j, and skips monitoring for other periods according to a static gap pattern over history window 350. In some examples the static gap pattern can be configured as a bitmap or bit-string, where 0 is used to indicate that the corresponding period can be skipped and 1 is used to indicate the corresponding period needs to be sensed. UE 110 can turn on a receiver (e.g., transceiver 220) to actively monitor for packets as shown by active times 335a-335e that correspond to the static sensed periods 310b, 310d, 310f, 310h, and 310j, and UE 110 can place the receiver in an idle or dormant state for the remaining periods of history window 350. While an alternating static gap pattern is shown, other static gap patterns are possible. During the static sensed periods 310, UE 110 monitors and stores slot occupancy information. In other words, for each monitoring occasion, the UE 110 determines whether any packets, or portions of packets, are sensed during the respective sensed periods 310, and stores the results in a memory (e.g., portion of memory 235) for future reference.

Near the end of sensed period 310j, UE 110 determines at time m that a new packet, packet 340, is to be transmitted. In other words, packet 340 is to be scheduled for a sidelink transmission by UE 110. UE 110 selects transmission (TX) resources (e.g., one or more slots) to use to transmit packet 340. UE 110 can choose slots from a common transmission TX pool structure.

Figure 8:
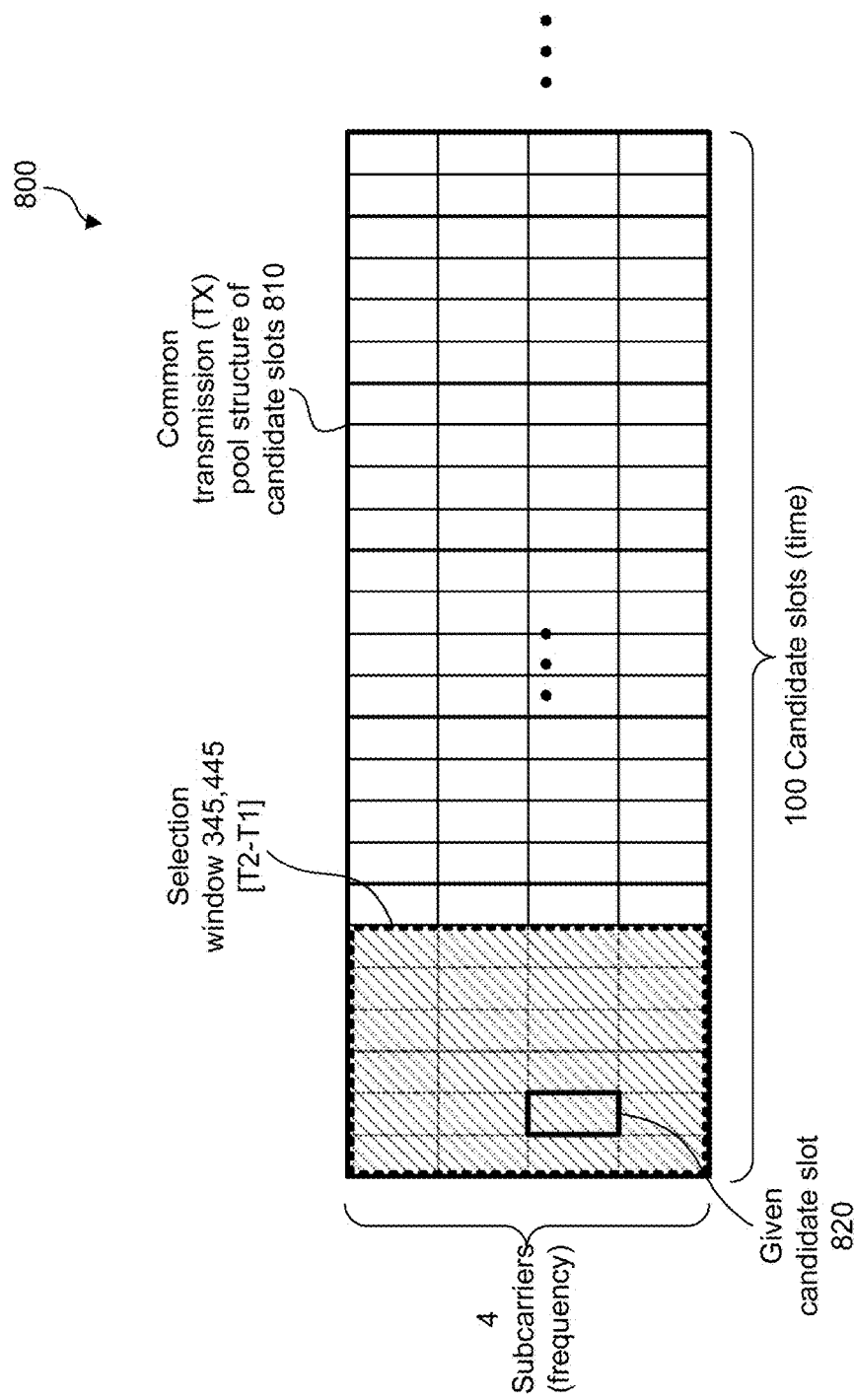
FIG. 8 illustrates an example common transmission (TX) pool structure of candidate slots, according to some embodiments of the disclosure.

FIG. 8 illustrates example 800 of a common TX pool structure of candidate slots 810, according to some embodiments of the disclosure. Common TX pool structure of candidate slots 810 includes a configured set of common resources in both time and frequency domain designated for all sidelink UEs in the same proximity to schedule a transmission resource. In example 800, common TX pool structure of candidate slots 810 includes 4 subcarriers in the frequency domain and 100 candidate slots in the time domain, which are repeated. UE 110 determines selection window 345 based on the packet delay budget of packet 340 and/or any predicted future arrivals. Selection window 345 of size [T2-T1] is shown as a subset of common TX pool structure of candidate slots 810. An example candidate slot is identified as given candidate slot 820, which represents particular time and frequency resource that can be potentially used for wireless communication.

To determine which candidate slots 810 of selection window 345 to utilize for future wireless communications 120, 130, 140, or 150, UE 110 determines: i) whether sufficient history data has been stored about the candidate slots of selection window 345 in history window 350; and ii) what subset of the set of candidate slots 810 corresponding to selection window 345 are likely unoccupied based on their respective histories. Some embodiments include a minimum number of candidate slot detections corresponding to the static sensed periods, s, during which results are sensed. In this example, s=5 for history window 350 that includes 10 periods. Thus, to be sufficiently sensed, sensed measurements for each candidate slot of selection window 345 should have been collected and stored during each of the static sensed periods, 310b, 310d, 310f, 310h, and 310j, to satisfy s=5. Otherwise, there is insufficient history about the candidate slots. If there is insufficient history, then UE 110 can randomly select one or more candidate slots 810 from selection window 345 to be used for transmitting packet 340 and any future wireless communication.

In example 300 there is sufficient history that has been stored. UE 110 sensed and collected measurements during active times 335a-335e, and UE 110 identifies projected selection windows 347a-347e. Projected selection windows 347a-347e are recorded sensed measurements that correspond to the candidate slots of selection window 345 collected and stored over history window 350. Since there are 5 projected selection windows and s=5, there is sufficient history that has been stored in a memory, such as memory 235.

FIG. 3B illustrates a detailed partial sensing example 320 using static sensing periods for UE 110 supporting SL-DRX and corresponding power conservation, according to some embodiments of the disclosure. Example 320 illustrates the projection of selection window 345 onto historical measurements of active time 335e and 335d. Example 320 also illustrates the size of selection window 345 being [T2-T1] as shown in example 800 of FIG. 8.

Since the sufficient history is confirmed, UE 110 examines sensed measurements within the projected selection windows 347a-347e to determine what subset of the set of candidate slots corresponding to selection window 345 are available (e.g., likely to be unoccupied for a future transmission.) UE 110 reviews the sensed results corresponding to projected selection windows 347a-347e to determine which of the candidate slots were occupied or unoccupied, and thus likely to be occupied or unoccupied in the future. For example, candidate slots within projected selection windows 347a-347e are checked to determine if an occupancy threshold is satisfied. If given candidate slot 820 is unoccupied for the majority of projected selection windows 347a-347e, the occupancy threshold is satisfied, and given candidate slot 820 can be used as a TX resource for a future wireless communications. The disclosure is not limited to a majority, and can be another occupancy threshold, e.g., 75% unoccupied, as will be understood by one skilled in the arts.

If there are not enough candidate slots to satisfy the occupancy threshold (and are hence available for use), then UE 110 can randomly select one or more TX slots from selection window 345 to be used for transmitting packet 340 and any future wireless communications.

Other history window 350 lengths and minimum number of periods sensed are possible. In some embodiments, selection windows 330 correspond to SL-DRX ON Durations. History periods 310a-310j are configurable. History periods should be less than or equal to the number of candidate slots in common TX pool structure of candidate slots 810, but greater than or equal to the number of candidate slots in selection window 345.

FIGS. 4A and 4B illustrate partial sensing example 400 using dynamic sensing arrangements for UE 110 supporting SL-DRX and corresponding power conservation, according to some embodiments of the disclosure. As a convenience and not a limitation, FIGS. 4A-4B, may be described with elements of FIGS. 1-3 and/or 8.

As described above, UE 110 conserves power by remaining in an idle mode during SL-DRX SLEEP Duration and wakes during SL-DRX ON Durations 430a-430j that are aligned with periods 410a-410j of history window 450. In example 400, there are k periods of history window 450 where k=10. UE 110 (e.g., system 200 or processor 210)

monitors for packets during SL-DRX ON Durations 430a-430j, but those times may be too short. The sensed measurements that are recorded may not include sufficient history for UE 110 to use when deciding on what candidate slots to use for future transmissions.

In some cases UE 110 can complete tasks and enter the dormant state at the end of the SL-DRX ON Duration (e.g., 430c, 430d, 430e, 430f, 430h, and 430j.) But in some cases, UE 110 can be awake longer than the SL-DRX ON Duration. For example, UE 110 may still be performing tasks (e.g., wireless communication 120 with V-UE 125) even after the SL-DRX ON Duration ends. After UE 110 completes the tasks, then UE 110 enters the SL-DRX SLEEP Duration. The time in which UE 110 is active including and beyond the SL-DRX ON Duration is called SL-DRX Active Time 435 and 4 instances are shown in example 400: 435a, 435b, 435c, and 435d.

In contrast to example 300 that collects sensed measurements according to static sensed periods, example 400 collects and stores sensed measurements during SL-DRX Active Times 435 that are dynamic. For example, the sensed measurements are collected over any longer awake times that dynamically extend beyond the normal SL-DRX ON Durations, per the discussion above. Accordingly, the number of SL-DRX Active Times 435 determined during one history window 450 is likely different than the number of active times in the next history window 450.

Some embodiments include sensing measurements during SL-DRX Active Times 435a. 435b, 435c, and 435d and recording the sensed measurements in memory (e.g., memory 235. For example, UE 110 awakens in period 410a during SL-DRX Active Time 435a and monitors the Physical SL Control Channel (PSCCH) of a configured minimum number of slots (e.g., slots 810) to be sensed (e.g., greater than SL-DRX ON Duration 430a.) UE 110 can decode a PSCCH of given candidate slot 820 for example, to determine whether UE 110 should take any actions with regard to given candidate slot 820. The decoded PSCCH of given candidate slot 820 (as well as the decoded PSCCH of the remaining candidate slots of the configured minimum number of slots) during SL-DRX Active Time 435a can be stored in memory such as memory 235 of system 200. Similar processes occur during SL-DRX Active Times 435b-435d.

Near the end of sensed period 410j, UE 110 determines at time-m that a new packet, packet 440, is to be transmitted. In other words, packet 440 is to be scheduled for a sidelink transmission. UE 110 selects TX resources (e.g., one or more slots) to use to transmit packet 440. UE 110 can choose slots from a common transmission TX pool structure. UE 110 determines selection window 445 based on the packet delay budget of packet 440 and/or any predicted future arrivals. Selection window 445 of size [T2-T1] is shown as a subset of common TX pool structure of candidate slots 810 of FIG. 8.

To determine which candidate slots of selection window 445 to utilize for future wireless communications 120, 130, 140, or 150, UE 110 determines: i) whether sufficient history data has been stored about the candidate slots of selection window 445 over history window 450; and ii) what subset of the set of candidate slots corresponding to selection window 445 are likely unoccupied, and hence TX resources for transmitting packet 440.

UE 110 can utilize sensing history for some or all of the candidate slots of selection window 445 by looking back at periods that are multiples of T (e.g., (Time of given candidate slot 820-T*r) where T can be multiples of 100 or any other common resource reservation interval. T and/or the length of each slot varies based on the subcarrier spacing selected for SL radio.) Parameter r is a numerical sequence which is used to project given candidate slot 820 back to history window 450. Parameter r can be a value from 1 to k, where k represents the number of periods within history window 450. In the example embodiments, the sensing periods 410a, 410b . . . 410j happened to match the SL-DRX cycle, which is not a necessary requirement for the method. In some other embodiments, those two periodicities may not be matched, and the overlapping of the sensed periods and SL-DRX active time are more arbitrary.

To determine whether there is sufficient history of sensed results under dynamic sensing arrangements like example 400, some embodiments establish parameters p, q, and k. Parameter q identifies a minimum number of sensed periods corresponding to SL-DRX Active Times 435 in which each of selection window 445 candidate slots are detected. One candidate slot can satisfy q with a different combination of 3 SL-DRX Active Times 435 than another candidate slot. Parameter p identifies a maximum number of sensed periods that are evaluated to satisfy q. History window 450 includes k periods and in example 400, k=10. Parameter q is less than or equal to p. Parameter p is less than k as p=k is equivalent to continuous monitoring. In examples 400 and 420, k=10, p=6, and q=3. Other history window 450 lengths and integer values for q, p, and k are possible. As described above, UE 110 collects sensed measurements during SL-DRX Active Times 435a, 435b, 435c, and 435d and records the sensed measurements in memory (e.g., memory 235 of system 200.) In some embodiments, the value of p can be derived from a static gap pattern configuration for partial sensing. For example the summation of the "1s" in a bitmap or bit-string can be equal to p, the required maximum number of sensed periods in history window 450.

FIG. 4B illustrates a detailed partial sensing example 420 using dynamic sensing arrangements for UE 110 supporting SL-DRX and corresponding power conservation, according to some embodiments of the disclosure. Example 420 is an enlarged view of a portion of example 400 that illustrates the projection of selection window 445 on the history data previously sensed and stored in SL-DRX Active Times 435d and 435c. Thus, sensed measurements corresponding to the candidate slots of selection window 445 were indeed collected and stored during SL-DRX Active Times 435d and 435c.

Example 420 also illustrates the size of selection window 445 being [T2-T1] as shown in example 800 of FIG. 8. Note that projected selection windows 447a and 447b are longer than the corresponding SL-DRX ON Durations 430i and 430g. Thus, utilizing only SL-DRX ON Durations 430 for collecting and recording sensed measurements may not produce sufficient history for making a proper assessment. In some embodiments, when SL-DRX is implemented, UE 110 can randomly select a candidate slot from selection window 445 without examining any history measurements for candidate slot detection and occupancy levels.

In some embodiments UE 110 checks the stored sensed measurements based on projected selection windows 447a, 447b, and 447c and determines that the sensed measurements corresponding to a set of candidate slots of selection window 445 were collected and stored during corresponding SL-DRX Active Times 435d, 435c, and 435b where q=3. In example 420 projected selection windows 447a. 447b included history for each of the candidate slots of selection window 445. But projected selection window 447c may include history for some, but not all, of the candidate slots of selection window 445. Thus, the set of candidate slots with sufficient sensed history can be less than that needed for the selection window 445. In other words, some candidate slots of selection window 445 will be disqualified from being a TX resource because of insufficient sensed history. For the candidate slots that did not have history found in projected selection window 447c, UE 110 can proceed to projected selection window 447d (since p has not yet been met) to satisfy q for the candidate slots. For example, given candidate slot 820 had history found in projected selection windows 447a, 447b, but not in projected selection window 447c so q=2 and p=3. UE 110 can proceed to examine projected selection window 447d. In this example, UE 110 finds the corresponding history for given candidate slot 820 and q=3 and p=4. Given candidate 820 becomes a member of the set of candidate slots whose historical occupancy levels are then examined.

Parameter q pertains to each candidate slot. In some embodiments some candidate slots of the set of candidate slots can be found in different combinations of q projected selection windows 447a, 447b, 447c, and 447d.

Knowing that q is satisfied, UE 110 determines that sufficient history regarding a set of candidate slots of selection window 445 is confirmed. UE 110 examines sensed measurements within the projected selection windows 447a-447c to determine which candidate slots satisfy an occupancy threshold and are likely to be unoccupied for a future transmission. For example, if given candidate slot 820 is unoccupied for the majority of projected selection windows 447a-447c, the occupancy threshold is satisfied, and given candidate slot 820 can be used as a TX resource for a future wireless communications 120, 130, 140 or 150. Candidate slots from the slots 810 that satisfy the occupancy threshold make up a subset of candidate slots from which UE 110 chooses to transmit packet 440. The disclosure is not limited to a majority, and can be another occupancy threshold, e.g. 75% unoccupied, as will be understood by one skilled in the arts.

In a different example, if there were not enough projected window selections 447 to satisfy q for enough candidate slots even though p was met, then there is not sufficient history to proceed with assessing occupancy levels. Thus, UE 110 can randomly choose one or more candidate slots from selection window 445 as needed to transmit packet 440.

Some embodiments include UE 110 (e.g., system 200 or processor 210) determining whether an actual sleep ratio during history window 450 satisfies a sleep ratio threshold. If the sleep ratio is satisfied, then there is not enough history sensed results and UE 110 randomly selects a candidate slot from selection window 445 for future wireless communications 120, 130, 140, or 150. To determine an actual sleep ratio, UE 110 can determine a sum of actual SL-DRX SLEEP times (these can be less than the SL-DRX SLEEP Duration due to the SL-DRX Actual Times that extend beyond SL-DRX ON Duration) over the history window 450 shown as the inactive spaces on the timeline of history window 450. UE 110 can divide the sum of the actual SL-DRX SLEEP times by the duration of history window 450. When the actual sleep ratio satisfies a sleep ratio threshold (e.g., meets or exceeds the sleep ratio threshold), there is not sufficient sensed results in history window 450. Accordingly, UE 110 can randomly select a candidate slot from selection window 445, and transmit via a transmitter (e.g., transceiver 220 of FIG. 2), a second signal via the selected candidate slot. When the actual sleep ratio does not satisfy the sleep ratio threshold, there is sufficient history. In some embodiments UE 110 proceeds to perform partial sensing as described in example 300 or 400. In some embodiments, the sleep ratio threshold may be set to 0, which is equivalent to disabling the sensing-based resource selection. In some embodiments, the sleep ratio threshold can be replaced with an equivalent configuration of active ratio threshold and the corresponding UE behavior described in this disclosure changes accordingly (e.g., if the actual active ratio satisfies an active threshold, UE 110 can randomly select a candidate slot from selection window 445).

Some embodiments include Uu Radio Resource Control (RRC) messaging (e.g., SystemInformationBroadcast or RRCReconfiguration) to configure parameters as described in partial sensing examples 300 and 400. For example, UE 110 can be configured by gNB 165 of FIG. 1 with the necessary configurations, which includes the following information: a flag that indicates whether partial sensing is enabled/disabled, or conditionally (disabled when SL-DRX is enabled); partial sensing period, SL-DRX cycle, SL-DRX ON Duration, and SL-DRX SLEEP Duration. In some embodiments, the SL-DRX cycle can be configured to be aligned with the periodicity of partial sensing periods. In some examples the sensing period (e.g., 310 or 410 of examples 300 and 400) is fixed as 100 subframes like LTE-V2X, but in 5G the partial sensing period can be variable; parameter integer values for s, p, q, and k; a minimum number of candidate slots to be sensed, a selection window size; or a sleep ratio threshold or an equivalent SL-DRX Active Time threshold. In some embodiments, if the values p and q are the same, then a single value can be used to configure the partial sensing gap requirement (e.g., example 400.) In some embodiments, the k may be a commonly known value, which can be fixed in technical specification does not need to be configured specifically in a signaling. In some other embodiments, the sleep ratio threshold can be replaced with an equivalent configuration of active ratio threshold. In some embodiments, the above configurations can be provisioned to UE 110 as pre-configuration without using actual RRC messages. In some embodiments, UE 110 can exchange some of all of the above configurations. For example, UE 110 can exchange information with V-UE 125, RSU 135, UE 145, and/or UE 155 via PC5 control signaling (such as PC5-RRC messages).

Figure 5:
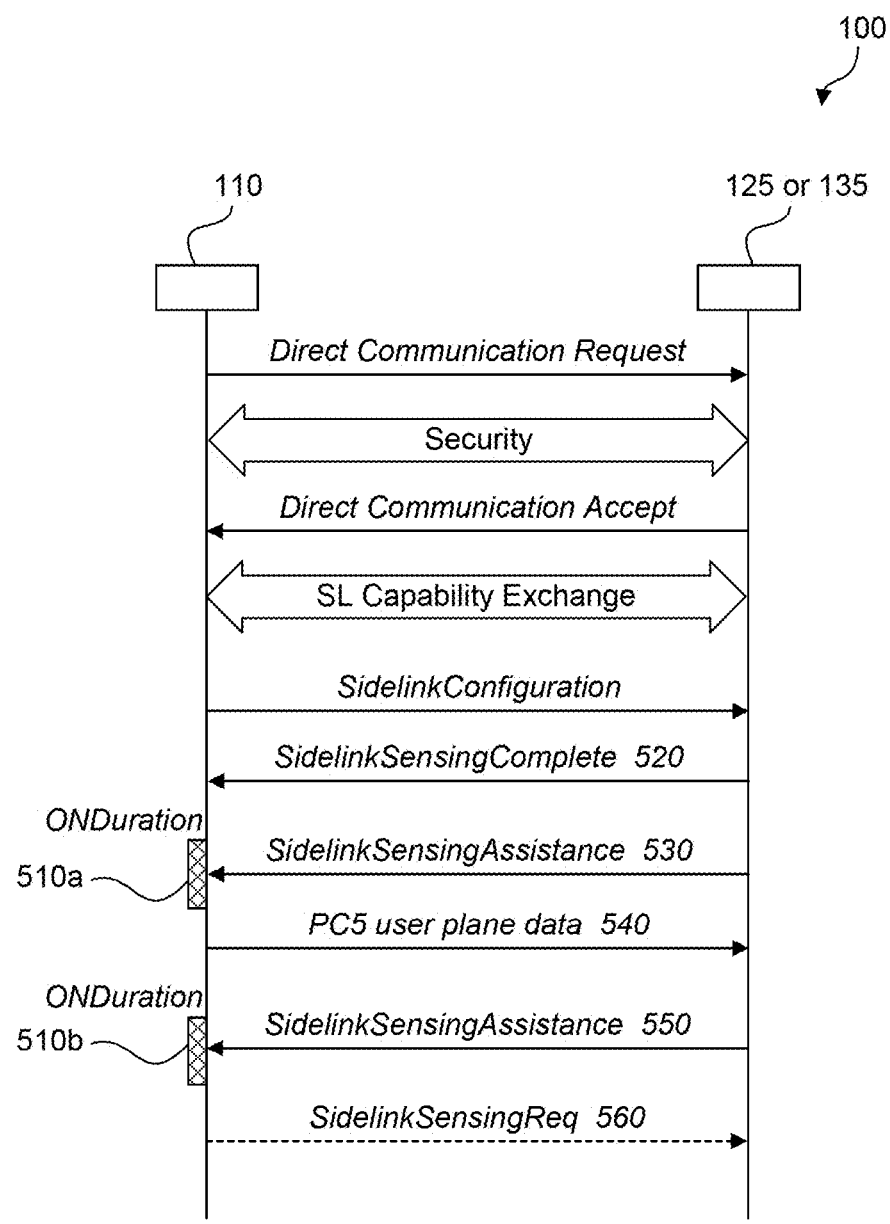
FIG. 5 illustrates an example using peer UE assisted sensing for a UE supporting SL-DRX, according to some embodiments of the disclosure.

FIG. 5 illustrates example 500 using peer UE assisted sensing for UE 110 supporting SL-DRX, according to some embodiments of the disclosure. As a convenience and not a limitation, FIG. 5, may be described with elements of previous figures. Some embodiments include UE 110 establishing a SL connection (e.g., SL unicast connection) with a peer UE that is not power-sensitive such as V-UE 125 or RSU 135. For example, during a SL capability exchange, V-UE 125 or RSU 135 can indicate that they can perform full sensing and are not affected by SL-DRX.

A peer UE can perform full sensing. Example 500 illustrates a peer UE transmitting SidelinkSensingComplete 520 to UE 110. Some embodiments include UE 110 changing methods for determining TX resources. For example, UE 110 can stop partial sensing (e.g., stop checking history window data to determine candidate slots as TX resources) and rely on sidelink sensed measurements from a peer UE.

A peer UE can provide the sidelink sensed measurements to UE 110 during SL-DRX ON Duration 510a periodically, or according to an event triggered. A peer UE knows the SL-DRX cycle of UE 110 and does not provide the sidelink sensed measurements during a SL-DRX SLEEP Duration. Some embodiments include a new Proximity Communication (Interface) 5 (PC5)-Radio Resource Control (RRC) message including but not limited to SidelinkSensingAssistance 530, that peer UE transmits to UE 110, where SidelinkSensingAssistance 530 includes the sidelink sensed measurements. Some embodiments include adding the sidelink sensed measurements with new measurement IDs to an existing PC5-RRC message including but not limited to MeasurementReportSidelink. The sidelink sensed measurements can include: i) a starting offset such as the timing (e.g., subframe/slot) for which the numbering of the candidate slot starts with index=0; and/or an array of index of positive candidates (e.g., sorted from best to worst), upper-bounded by UE 110 needs. The index can be counted on a common TX pool structure of time-frequency two-dimensional map of candidate slots. For example for a selection window duration that includes 100 slots, each with 4 subchannels, then the full index list of all candidate slots is 0=399.

UE 110 can use the sidelink sensed measurements to determine and manage a positive candidate list. In some examples, UE 110 can exclude some candidate slots from the positive candidate list based on UE 110 conflicts. UE 110 can select a slot from the positive candidate list as a TX resource for wireless communications 120, 130, 140, or 150. In some examples the selection from the positive candidate list can be random.

UE 110 can select and use a TX resource from the positive candidate list to transmit PC5 user plane data 540 to peer UE (e.g., for wireless communication 120 with V-UE 125 or wireless communication 130 with RSU 135.)

A peer UE can transmit during SL-DRX ON Duration 510*b*, updated sidelink sensed measurements in SidelinkSensingAssistance 550 periodically, or according to an event triggered.

Some embodiments include UE 110 soliciting sidelink sensed measurements from peer UE on demand. UE 110 can use RRCReconfigurationSidelink to enable and configure peer UE to perform sensing measurements. In the configuration, UE 110 can indicate for each TX pool: i) a number of candidate slots needed; ii) a threshold to determine whether a candidate slot is positive (e.g., likely unoccupied); and/or iii) whether the reporting is periodic or a one-time occurrence. In some examples the solicitation of the sidelink sensed measurements can be conditional based on the enabling of SL-DRX in PC5 interface. If UE 110 does not solicit the sidelink sensed measurements from peer UE, then the peer UE can follow cell-specific common configurations or pre-configuration.

Some embodiments include UE 110 establishing PC5 connections with multiple peer UEs and multiple sidelink DRX configurations. For example, if UE 110 establishes a SL connection with V-UE 125 and another SL connection with RSU 135, the corresponding sidelink sensed measurements from the corresponding peer UE will be in corresponding proximity of UE 110. Thus, UE 110 determines corresponding positive candidate lists associated with corresponding wireless communications 120 and 130. UE 110 selects TX resources (e.g., slots) from the corresponding positive candidate list. Some embodiments include UE 110 determining a conflict (e.g., half-duplex) caused by other links (e.g., SL connections) and can exclude one or more slots from a positive candidate list.

In some embodiments UE 110 may be part of a group of UEs where a group leader UE of the group does not perform SL-DRX (e.g., V-UE 125, RSU 135) or performs less SL-DRX, e.g., UE 110 that obtains sidelink sensed measurements from a peer UE. For SL-DRX configuration group service, the group leader UE can groupcast the sidelink sensed measurements to the whole group so that other UEs, especially P-UEs in the group do not need to perform sensing. If PC5-RRC or Media Access Control (MAC)-Control Element (CE) supports a one-to-many connection, then this signaling can be supported in the AS layer. Otherwise, sensing results can be shared in upper layer protocols or application layer protocols with group specific messages.

Figure 6:
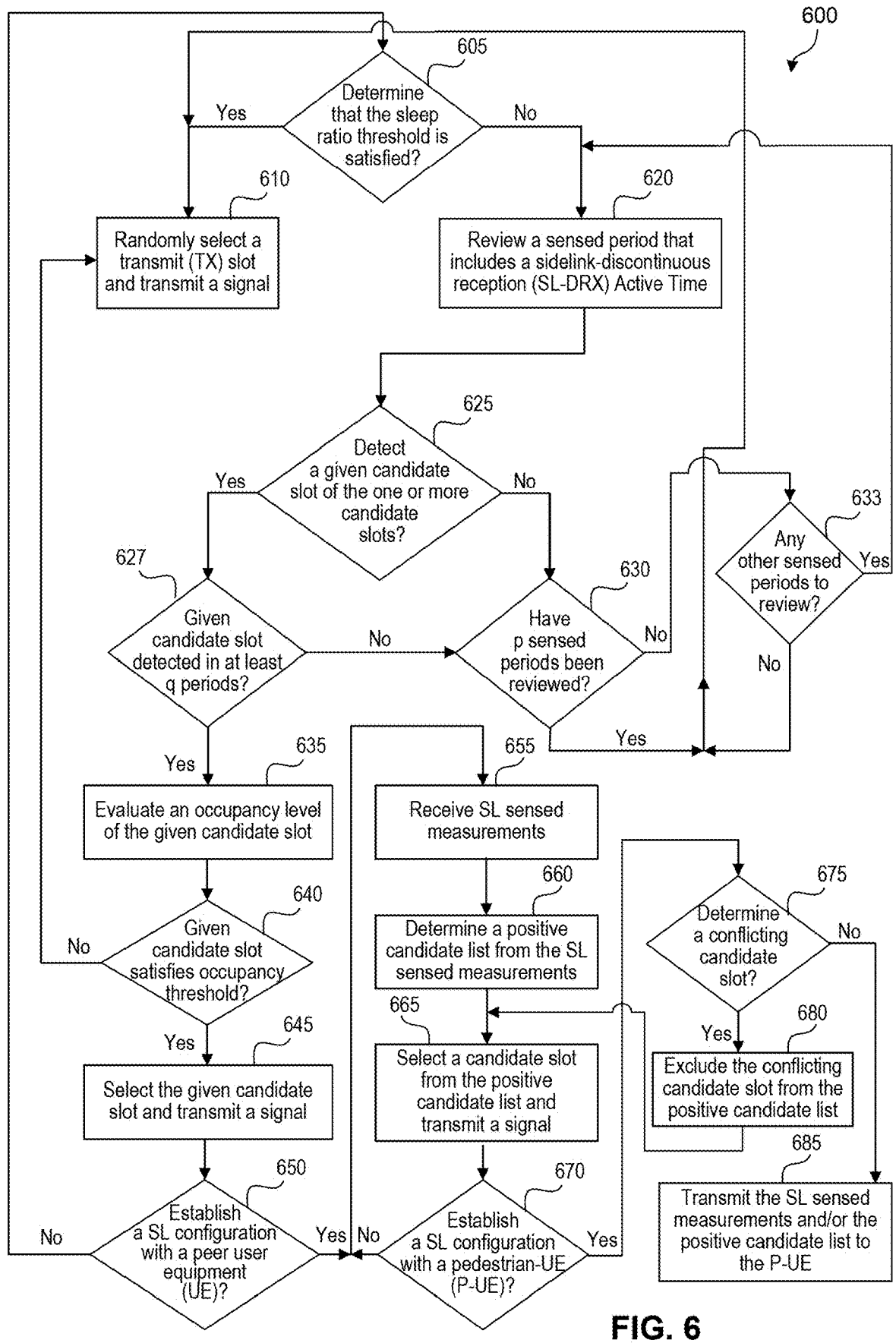
FIG. 6 illustrates an example method for a UE supporting SL-DRX, according to some embodiments of the disclosure.

FIG. 6 illustrates example method 600 for UE 110 supporting SL-DRX, according to some embodiments of the disclosure. As a convenience and not a limitation, FIG. 6, may be described with elements of previous figures. For example, method 600 can be performed by UE 110, system 200, or processor 210. In some embodiments UE 110 receives a packet 440 that includes a set of potential candidate slots that may be used for future wireless communications.

At 605, UE 110 determines whether the sleep ratio threshold is satisfied. In other words, UE 110 determines whether enough sensed results exist in history window 450 to properly select a candidate slot (e.g., from slots 810) from selection window 445. When the sleep ratio is satisfied, UE 110 determines there is not sufficient history and method 600 proceeds to 610. Otherwise, UE 110 determines sufficient history exists and method 600 proceeds to 620.

At 610, UE 110 randomly selects a candidate slot from selection window 445 and uses that candidate slot to transmit a signal (e.g., wireless communication 120, 130, 140, or 150.)

At 620, UE 110 reviews whether past sensed measurements of a candidate slot (e.g., given candidate slot 820) of selection window 445 was stored during an SL-DRX Active Time in a sensed period (e.g., 410*b*, 410*d*, 410*i*, or 410*j*). In other words, UE 110 determines whether stored sensed measurements correspond to a projected selection window (e.g., 447*a*-447*d*) over history window 450. The past sensed measurements can be stored and retrieved from a memory, such as memory 235.

At 625, UE 110 determines whether a candidate slot (e.g., given candidate slot 820) of selection window 445 is detected in the SL-DRX Active Time (e.g., 435*a*.) When the given candidate slot is detected, method 600 proceeds to 627. Otherwise, method 600 proceeds to 630.

At 627 when the given candidate slot is detected, UE 110 determines whether the given candidate slot is detected in at least q sensed periods. When q=3, UE 110 determines whether given candidate slot 820 is detected in at least 3 of 410*a*, 410*b*, 410*g*, or 410*i*. When q is satisfied, given candidate slot 820 has sufficient measurement history over history window 450. Candidate slots that satisfy q make up a set of candidate slots. The set of candidate slots can be a subset of selection window 445, method 600 proceeds to 635. Otherwise, method 600 proceeds to 630.

At 630, UE 110 determines whether p sensed periods have been reviewed. In example 400 p=6, but there are only 4 sensed periods (e.g., 410*a*, 410*b*, 410*g*, or 410*i*). When p is not satisfied method 600 proceeds to 633. When p is satisfied, method 600 returns to 610 to randomly select a candidate slot from selection window 445. In other words, when the maximum number of sensed periods is met. UE 110 decides to stop evaluating sensed history and randomly chooses a candidate slot for transmitting packet 440.

At 633, UE 110 determines whether other sensed periods remain to be reviewed. When other sensed periods are not yet reviewed and p is not met, method 600 returns to 620. Otherwise, method 600 returns to 610.

At 635, UE 110 evaluates an occupancy level of the given candidate slot.

At 640, UE 110 determines whether the given candidate slot, e.g., slot 820, satisfies an occupancy threshold. When the occupancy threshold is satisfied (e.g., given candidate slot 820 was primarily unoccupied during the q sensed periods) method 600 proceeds to 645. Otherwise, method 600 returns to 610.

At 645, UE 110 selects given candidate slot 820 and transmits a signal using the given candidate slot. In some embodiments, UE 110 assesses each of the candidate slots of selection window 445 and then selects a positively assessed candidate slot as a TX resource for transmitting wireless communications 120, 130, 140, or 150. In some embodiments, one or more candidate slots can be selected according to method 600 to transmit the wireless communications 120, 130, 140 or 150.

At 650, UE 110 determines whether a SL connection with a peer UE is established. UE 110 can for example, establish another SL connection with a peer UE and obtain assistance from the peer UE to select resources. In some examples UE 110 can stop sensing and partial sensing and rely on the SL measured results that the peer UE measures and saves. When a SL connection is established, method 650 proceeds to 655. Otherwise, method 600 proceeds to 605.

At 655, UE 110 receives SL sensed measurements from the peer UE during a SL-DRX ON Duration. The peer UE may not be utilizing SL-DRX (e.g., V-UE 125 or RSU 135 or a peer UE that has access to SL sensed measurements. In some embodiments UE 110 solicits the SL sensed measurements from the peer UE.

At 660, UE 110 determines a positive candidate list from the SL sensed measurements.

At 665, UE 110 selects a candidate slot from the positive candidate list and transmits a signal using the selected candidate slot.

At 670, UE 110 determines whether a SL connection with a P-UE is established. When the SL connection is established, method 600 proceeds to 675. Otherwise, method 600 returns to 655.

At 675, UE 110 determines whether a candidate slot on the positive candidate list conflicts with a slot associated with the SL connection with the P-UE. When a conflicting candidate slot is determined, method 600 proceeds to 680. Otherwise, method 600 proceeds to 685.

At 680, UE 110 excludes the conflicting candidate slot from the positive candidate list and method 600 returns to 665.

At 685, UE 110 transmits the SL sensed measurements and/or the positive candidate list to the P-UE. For example, the P-UE may be part of a group with UE 110 where the P-UE does not perform sensing. UE 110 may be a group leader.

Some embodiments include UE 110 detecting that SL-DRX is enabled and randomly choosing one or more candidate slots from selection window 445 without checking data of a history window (e.g., history window 350, 450). UE 110 can transmit a signal via the selected one or more candidate slots.

Figure 7:
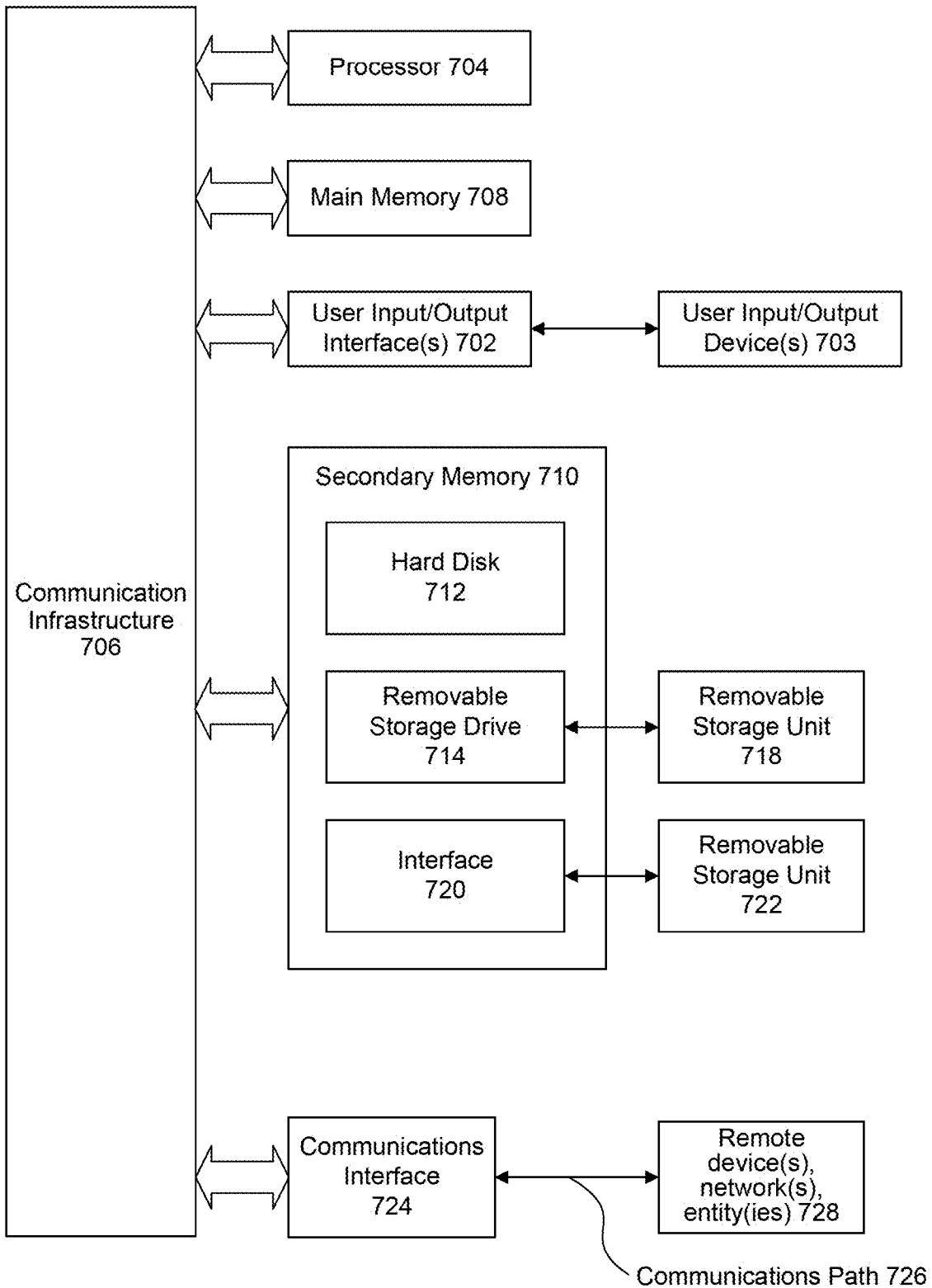
FIG. 7 is an example computer system for implementing some embodiments or portion(s) thereof.

Various embodiments can be implemented, for example, using one or more well-known computer systems, such as computer system 700 shown in FIG. 7. Computer system 700 can be any well-known computer capable of performing the functions described herein. For example, and without limitation, system 200 of FIG. 2, example 400 of FIG. 4, method 500 of FIG. 5, method 600 of FIG. 6 (and/or other apparatuses and/or components shown in the figures) may be implemented using computer system 700, or portions thereof.

Computer system 700 includes one or more processors (also called central processing units, or CPUs), such as a processor 704. Processor 704 is connected to a communication infrastructure or bus 706. One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods. etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources. e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE) system comprising:
a transceiver; and
a processor coupled to the transceiver, configured to:
determine a set of candidate slots that have been sensed over a plurality of sensed periods of a history window, wherein a sensed period of the plurality of sensed periods corresponds to a sidelink discontinuous reception (SL-DRX) Active Time duration that exceeds an SL-DRX ON Duration, and wherein the plurality of sensed periods is less than a plurality of periods of the history window;
determine a subset of candidate slots from the set of candidate slots based at least on an occupancy threshold;
select a first candidate slot from the subset of candidate slots; and
transmit via the transceiver, a first signal via the first candidate slot.

2. The UE of claim 1, wherein a plurality of SL-DRX Active Time durations including the SL-DRX Active Time duration corresponds to a static gap pattern over the history window.

3. The UE of claim 1, wherein to determine the set of candidate slots of a number of slots that have been sensed, the processor is configured to:
detect at least q sensed periods including the sensed period of the plurality of sensed periods, wherein the set of candidate slots correspond to a selection window over the q sensed periods, wherein q is an integer less than or equal to p,
wherein p is an integer corresponding to a maximum number of sensed periods of the history window that are evaluated to detect the at least q sensed periods.

4. The UE of claim 1, wherein to determine the set of candidate slots, the processor is configured to:
monitor a Physical Sidelink Control Channel (PSCCH) during the SL-DRX Active Time duration; and
determine candidate slots of the set of candidate slots associated with the PSCCH based at least on a projection of a selection window applied to measurements corresponding to the monitoring.

5. The UE of claim 3, wherein the processor is further configured to: determine the selection window based on a packet delay budget of a packet corresponding to the first signal.

6. The UE of claim 1, wherein the processor is further configured to:
wherein a SL-DRX cycle comprises the SL-DRX ON Duration and an SL-DRX SLEEP Duration, align a duration of the SL-DRX cycle with the sensed period of the plurality of sensed periods of the history window.

7. The UE of claim 1, wherein to select the first candidate slot, the processor is configured to randomly select the first candidate slot of the subset of candidate slots.

8. The UE of claim 1, wherein to determine the set of candidate slots that are sensed, the processor is further configured to:
determine a sum of actual SL-DRX SLEEP times over the history window;
determine an actual sleep ratio comprising: the sum of the actual SL-DRX SLEEP times divided by the history window;
determine that the actual sleep ratio satisfies a sleep ratio threshold;
based on the sleep ratio threshold being satisfied, randomly select a second candidate slot from a selection window; and
transmit via the transceiver, a second signal via the second candidate slot.

9. The UE of claim 1, wherein to determine the set of candidate slots, the processor is configured to:
determine, for the first candidate slot of the subset of candidate slots, that a corresponding occupancy level over the history window satisfies the occupancy threshold.

10. The UE of claim 1, wherein the processor is further configured to:
establish a sidelink (SL) configuration with a peer UE, wherein the peer UE performs full sensing;
discontinue determining the set of candidate slots that are sensed over the history window;
receive, via the transceiver, during the SL-DRX ON Duration, SL sensed measurements from the peer UE;
determine based at least on the SL sensed measurements, a positive candidate list;
select a second candidate slot from the positive candidate list; and
transmit via the transceiver, a second signal via the second candidate slot.

11. The UE of claim 10, wherein the processor is further configured to:
transmit a radio resource control (RRC) signal to the peer UE soliciting the SL sensed measurements of the peer UE.

12. The UE of claim 10, wherein the processor is further configured to:
establish a second SL connection with a pedestrian-UE (P-UE);
determine the second candidate slot based on the second SL connection that conflicts with the positive candidate list; and
exclude the second candidate slot from the positive candidate list.

13. The UE of claim 10, wherein the processor is further configured to:
establish a second SL connection with a pedestrian-UE (P-UE), wherein the P-UE and the UE comprise a group; and
transmit the SL sensed measurements to the P-UE, wherein the P-UE does not perform sensing for candidate slots.

14. The UE of claim 10, wherein the peer UE comprises: a vehicle UE (V-UE) or a road side unit (RSU).

15. A method for a user equipment (UE) system comprising:
- determining a set of candidate slots of a number of slots that have been sensed over a plurality of sensed periods of a history window, wherein a sensed period of the plurality of sensed periods corresponds to a sidelink discontinuous reception (SL-DRX) Active Time duration that exceeds an SL-DRX ON Duration, and wherein the plurality of sensed periods is less than a plurality of periods of the history window;
- determining a subset of candidate slots from the set of candidate slots based at least on an occupancy threshold;
- selecting a first candidate slot from the subset of candidate slots; and
- transmitting a first signal via the first candidate slot.

16. The method of claim 15, wherein the determining the set of candidate slots of the number of slots that have been sensed comprises:
- detecting at least q sensed periods including the sensed period of the plurality of sensed periods, wherein the set of candidate slots correspond to a selection window over the at least q sensed periods, wherein q is an integer greater than or equal to p,
- wherein p is an integer corresponding to a maximum number of sensed periods of the history window that are evaluated to detect the at least q sensed periods.

17. The method of claim 15, wherein the determining the set of candidate slots further comprises:
- monitoring a Physical Sidelink Control Channel (PSCCH) during the SL-DRX Active Time duration; and
- determining candidate slots of the set of candidate slots associated with the PSCCH based at least on a projection of a selection window applied to measurements corresponding to the monitoring.

18. The method of claim 15, further comprising:
- determining a sum of actual SL-DRX SLEEP times over the history window;
- determining an actual sleep ratio comprising: the sum of the actual SL-DRX SLEEP times divided by the history window;
- determining that the actual sleep ratio satisfies a sleep ratio threshold;
- based on the sleep ratio threshold being satisfied, randomly selecting a second TX slot from a selection window; and
- transmitting via a transceiver, a second signal via the second TX slot.

19. The method of claim 16, further comprising:
- establishing a sidelink (SL) configuration with a peer UE, wherein the peer UE performs full sensing;
- discontinuing detecting the at least q sensed periods;
- receiving via a transceiver, during the SL-DRX ON Duration, SL sensed measurements from the peer UE;
- determining based at least on the SL sensed measurements, a positive candidate list;
- selecting a second candidate slot from the positive candidate list; and
- transmitting via the transceiver, a second signal via the second candidate slot.

20. A non-transitory computer-readable medium storing instructions that, when executed by a processor of a user equipment (UE), cause the UE to perform operations, the operations comprising:
- determining a set of candidate slots that have been sensed over a plurality of sensed periods of a history window, wherein a sensed period of the plurality of sensed periods corresponds to a sidelink discontinuous reception (SL-DRX) Active Time duration that exceeds an SL-DRX ON Duration, and wherein the plurality of sensed periods is less than a plurality of periods of the history window;
- determining a subset of candidate slots of the set of candidate slots based at least on an occupancy threshold over the history window;
- selecting a first candidate slot from the subset of candidate slots; and
- transmitting a first signal via the first candidate slot.

* * * * *